United States Patent [19]

Koga

[11] Patent Number: 4,723,161
[45] Date of Patent: Feb. 2, 1988

[54] METHOD AND ARRANGEMENT OF CODING DIGITAL IMAGE SIGNALS UTILIZING INTERFRAME CORRELATION

[75] Inventor: Toshio Koga, Tokyo, Japan
[73] Assignee: NEC Corporation, Japan
[21] Appl. No.: 841,175
[22] Filed: Mar. 19, 1986

[30] Foreign Application Priority Data

Mar. 20, 1985 [JP] Japan .................................. 60-57336
Mar. 20, 1985 [JP] Japan .................................. 60-57338

[51] Int. Cl.$^4$ ............................................. H04N 7/12
[52] U.S. Cl. ..................................... 358/136; 358/135
[58] Field of Search ................ 358/136, 125, 135, 133

[56] References Cited

U.S. PATENT DOCUMENTS 4,077,053 2/1978 Ishiguro .............................. 358/136
4,591,909 5/1986 Kuroda et al. ...................... 358/136

OTHER PUBLICATIONS

"Some Experiments in Adaptive and Predictive Halamard Transform Coding of Pictures", Netravali et al.; Bell Technical Journal vol. 56, #8, Oct. 1977, pp. 1531–1547.

Primary Examiner—James J. Groody
Assistant Examiner—Victor R. Kostak
Attorney, Agent, or Firm—Ostrolenk, Faber, Gerb & Soffen

[57] ABSTRACT

In order to encode image signals using interframe correlation while maintaining high data compression as well as high resulting images, a motion compensated interframe prediction error is orthogonally transformed and then is subject to quantization. Thereafter, the quantized error signal undergoes inverse orthogonal transformation. In order to compensate for distortions caused by the quantization, a difference between the inversely orthogonally transformationed error signal and the original prediction error signal is quantized. By selecting the quantization characteristics, the influence or contribution of the orthogonal transformation can be controlled continuously.

4 Claims, 6 Drawing Figures

METHOD AND ARRANGEMENT OF CODING DIGITAL IMAGE SIGNALS UTILIZING INTERFRAME CORRELATION

BACKGROUND OF THE INVENTION

1. Field of the Invention

This invention relates to a method and arrangement for prediction coding via correlation between consecutive frames of digital image signals for data compression or redundancy reduction of information to be transmitted, and more specifically to such a method and arrangement which feature high reproduction quality ranging from still pictures to very rapidly moving ones.

2. Description of the Prior Art

In order to compress digital images to be transmitted for the purposes of redundancy reduction, interframe prediction through correlation has been found effective. This prior art technique, when applied to still or relatively still images or pictures, is capable of realizing very high data compression as well as high reproduction quality.

The above-mentioned known technique, however, has encountered the problem that, when encoding images exhibiting rapid movement or displacement while maintaining high data compression, the reproduced pictures tend to degrade in quality. This is because the interframe correlation decreases with increase movement of an object between frames. A known approach to solving this problem is "motion compensation" technique, which utilizes intraframe movement or displacement (motion vector) to obtain high prediction probability. Motion compensation has found excellent applications in encoding image or picture signals of objects which are undergoing rapid movement, and hence high data compression as well as high fidelity of picture reproduction can be achieved. For further data relating to this motion compensation technique, reference should be had to an article entitled "Television Bandwidth Compression Transmission by Motion-Compensated Interframe Coding" (IEEE Communication Magazine, pp. 24–30, November 1982), and also to U.S. Pat. No. 4,077,053 issued on Feb. 28, 1978 in the name of Ishiguro.

The motion compensation, however, is not suitable in applying same to encoding signals of objects which are undergoing extremely rapid movement. More specifically, there exists the problem that the amount of encoded information becomes excessive due to inappropriate data compression and cannot be transmitted at the limited transmission rates available. In order to overcome the problem, viz., to reduce the information to be transmitted, the following approaches have been proposed: (a) changing the quantization characteristics from fine to coarse by increasing the quantization level, (b) reducing the number of pixels to be encoded (viz., subsampling), (c) reducing the number of fields to be encoded (viz., frame skipping), and (d) temporarily terminating the encoding itself. However, utilizing coarse quantization characteristics leads to impairment of reproduced pictures called "dirty window effect". That is, the reproduced pictures become dim as if viewed through a soiled window. On the other hand, the subsampling or frame skipping may cause temporary stoppage of reproduced pictures. This phenomenon tends to disturb the viewer rather than obscuring the reproduced pictures due to lowering of spatial resolution.

In an effort to realize effective redundancy reduction in transmitting very rapid image signals, it has been proposed to apply orthogonal transformation to the prediction error signals derived from motion compensation. In connection with this prior art, reference should be had to "Displacement Measurement and Its Application in Interframe Image Coding" (IEEE Trans. Commun., Vol. COM-29 No. 12, pp. 1799–1808, December 1981). When applying this prior art to the case where encoded information is transmitted at a low transmission rate, most of the AC (alternate current) components of the orthogonal transformation coefficients should be neglected. In this case, it is usual to cut off or discard the coefficients corresponding to sophisticated patterns. Consequently, the reproduced complex pattern becomes somewhat dim. This however, causes no significant problem concerning visual sensation in that the viewer is not particularly sensitive to the obscurity of a very rapidly moving image.

It is understood that the orthogonal transformation contributes to effective data redundancy reduction if applied to encoding of pictures wherein the image is moving very rapidly. This stems from the fact that the correlation between consecutive frames is very high.

Contrarily, when encoding slow moving image information, the orthogonal transformation is no longer useful in that the interframe correlation is low. This can be illustrated by encoding the signals of slow or not extremely rapid moving images using the motion compensation, in the case of which the prediction errors occur isolately near the boundaries of a moving object. This means that the intraframe correlation of the prediction error signals is very low. As a result, if the orthogonal transformation is used in the above case, the reproduced picture quality is impaired to a considerable extent.

According to the prior art, however, there is no method or arrangement which enables the encoding of images ranging from still pictures to very rapidly moving pictures while maintaining high data compression as well as high reproduction quality.

SUMMARY OF THE INVENTION

Therefore, an object of this invention is to provide a method of encoding digitized images signals using correlation between consequtive frames for data compression or redundancy reduction.

Another object of this invention is to provide a method and arrangement for encoding digitized image signals via correlation between cosecutive frames, wherein resulting images or pictures of high quality can be obtained even though they contain from still to very rapidly moving content.

One aspect of this invention takes the form of a method of interframe prediction encoding an incoming image signal by correlating consecutive frames, comprising the steps: (a) producing an interframe prediction signal; (b) obtaining a prediction error signal by deriving a difference between the incoming image signal and the interframe prediction signal; (c) causing the prediction error signal to undergo orthogonal transformation on a block by block basis; (d) quantizing the resulting signal obtained at step (c) using a first quantization characteristics; (e) causing the quantized signal obtained at step (c) to undergo inverse orthogonal transformation; (f) deriving a difference between the prediction error signal and the signal resulting from the inverse orthogonal transformation; (g) quantizing the difference obtained at step (f) using a second quatization characteristics; and (h) code converting the results obtained at steps (d) and (g).

BRIEF DESCRIPTION OF THE DRAWINGS

The features and advantages of the present invention will become more clearly appreciated from the following description taken in conjunction with the accompanying drawings in which like blocks, circuits or circuit elements are denoted by like reference numerals and in which.

DETAILED DESCRIPTION OF THE PREFERRED EMBODIMENTS

Before describing the preferred embodiments in detail, the principle underlying this invention will first be discussed with reference to FIGS. 1 and 2.

This invention is found most effective when the motion compensation is concurrently applied, but is not restricted to such utilization.

Figure 1:
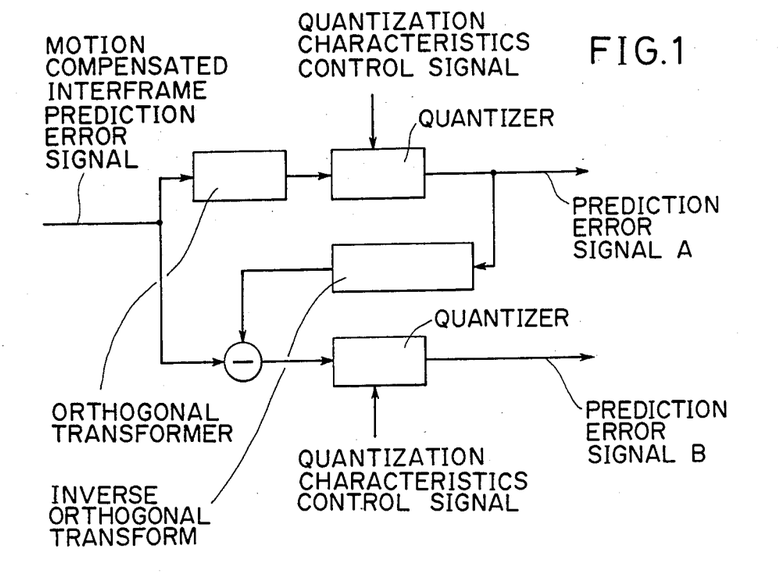
FIG. 1 is a block diagram showing the circuit arrangement which characterizes this invention.
Figure 2:
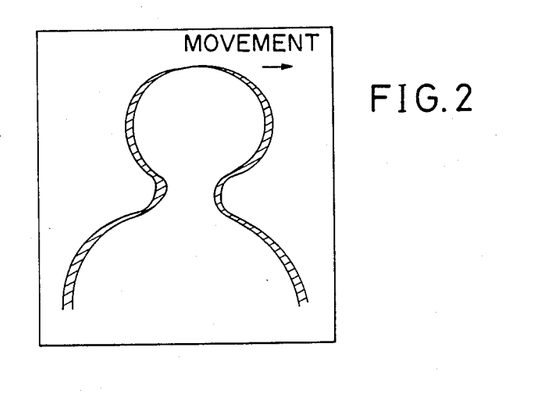
FIG. 2 is a sketch illustrating prediction error zones which occur near the boundaries of a moving object image.

FIG. 1 is a block diagram showing in simplified form the circuit arrangement which characterizes this invention, while FIG. 2 is a sketch of an image of a bust of a person (for example) which is moving horizontally. It is assumed that the moving speed is in a range during which the motion compensation is effectively carried out. FIG. 2 further illustrates, by hatching, prediction error zones which occur along or around the image boundary. In the case where such prediction errors undergo orthogonal transformation, most of resultant transformation coefficients assumes very small amplitudes. When these transformation coefficients undergo inverse orthogonal transformation, most of the resulting signals (viz., prediction errors) assume values close to zero.

In other words, the resulting or reproduced picture image includes distortions along the boundary. It follows therefore that the application of orthogonal transformation to such a case is liable to increase distortion of the resulting images, and hence should not be utilized. Contrarily, if the image to be encoded moves very rapidly, then the orthogonal transformation is useful for effective data compression as well as high quality of resulting images.

In order to take advantage of the merits of both methods, if the orthogonal transformation is selectively applied according to the displacement speed of an object image to be transmitted, then the picture image quality changes abruptly upon changing to a mode wherein orthogonal transformation is not used, and vice versa. As a consequence, this technique has not proven successful.

In order to overcome this problem, according to this invention, a motion compensated interframe prediction error is orthogonally transformed and then is subject to quantization. Thereafter, the quantized error signal undergoes inverse orthogonal transformation. In order to compensate for distortions caused by the quantization, a difference between the inversely orthogonally transformationed error signal and the original prediction error signal is quantized. By selecting the quantization characteristics, the influence or contribution of the orthogonal transformation can be controlled continuously.

More specifically, the orthogonal transformation is strongly suppressed as long as the motion compensation is effective. On the contrary, as the effect due to the motion compensation decreases, the orthogonal transformation is allowed to prevail. Thus, the distortions along the boundaries of resultant picture images due to the orthogonal transformation can be avoided. Further, the resulting picture images having intermediate range of moving speeds have picture quality which changes continuously or smoothly.

Whether or not the orthogonal transformation is utilized, is determined with ease by checking whether a detected motion vector exceeds a predetermined range of motion compensation. It should be noted that in a usual motion vector detection, the swift movement exceeding the motion compensating region is limited to the maximum value. In this case, although the value of actual motion vector can not be known, there is no problem in determining whether or not the orthogonal transformation is to be applied. Further, it should be noted that when the motion vector is transmitted, there is no need of transmitting the information for controlling the quantization characteristics.

Figure 3:
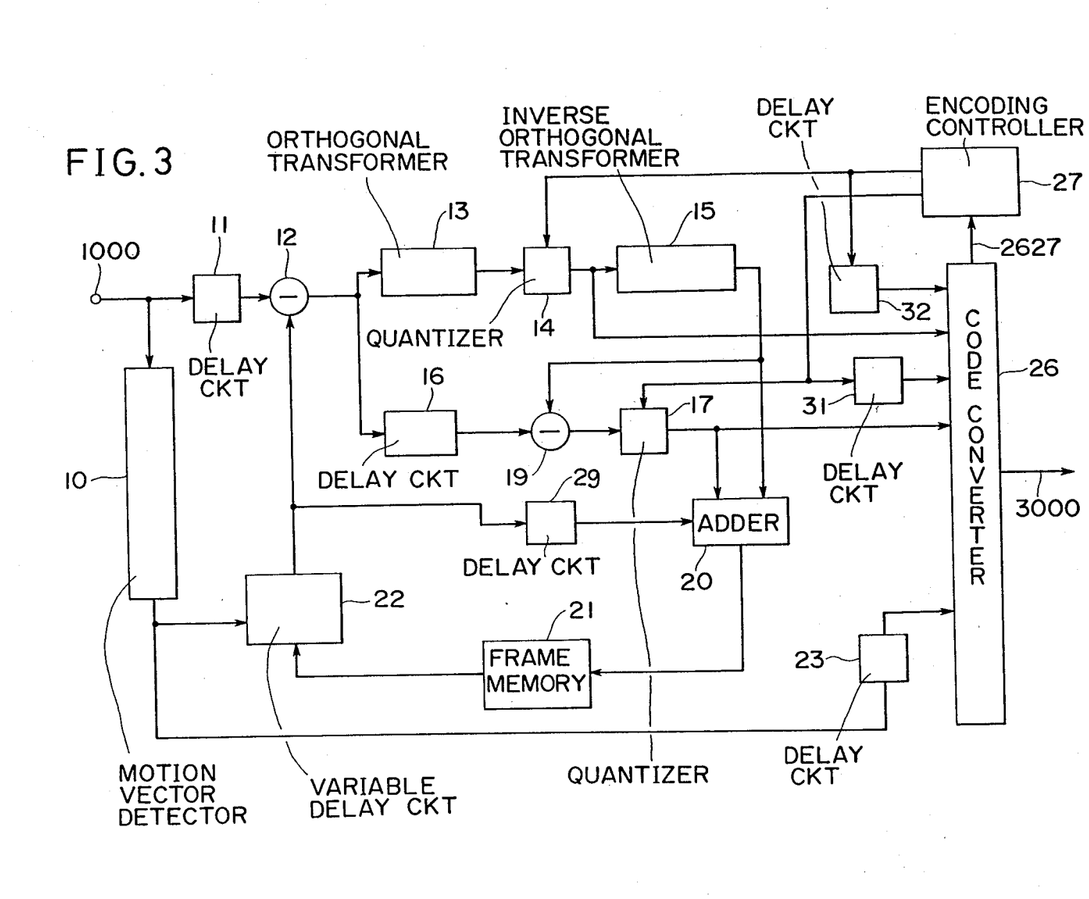
FIG. 3 shows in block diagram form an encoder according to this invention.

FIG. 3 is a block diagram showing an encoder according to this invention, which includes a motion vector detector 10, delay circuits 11, 16, 23, 29, 31 and 32, subtracters 12 and 19, an orthogonal transformer 13, quantizers 14 and 17, an inverse orthogonal transformer 15, an adder 20, a frame memory 21, a variable delay circuit 22, a code converter 26, and an encoding controller 27, all of which are coupled as shown.

Motion picture signals are applied, via an input terminal 1000, to the motion vector detector 10 and the delay circuit 11. The detector 10 is adapted to detect the magnitude of velocity and direction (viz., motion vector) of an object on a block by block basis, wherein each block is an N-line×M-pixel size (for example), and thence applies the motion vectors detected to the variable delay circuit 22 and the delay circuit 23. The variable delay circuit 22 is suppied with a locally decoded signal from the frame memory 21, and provides same with a delay according to the motion vector received, and then applies the output thereof (viz., prediction signal) to the subtracter 12 and the delay circuit 29. It should be noted that the locally decoded signal applied to the variable delay circuit 22, has already been delayed by about one frame. The delay circuit 11 provides the incoming motion picture signal with a delay corresponding to the time period required to detect the motion vector at the detector 10, and applies the output thereof to the subtracter 12. The subtracter 12 determines the difference between the two signals applied thereto, and outputs prediction error signals which are applied to the delay circuit 16. The output of the subtracter 12 undergoes orthogonal transformation (Adamal transformation, discrete cosine transformation, etc.) at the orthogonal transformer 13 on a block by block basis, wherein the block size is preferably selected equal to that of the block processed in the motion vector detector 10 and is preferably set $M=N=2^n$ (wherein n is a whole positive integer) in order to facilitate the data processing. The output of the orthogonal transformer 13 is then quantized at the quantizer 14, and thereafter fed to the inverse orthogonal transformer 15 and the code converter 26. The details of the code converter 26 will be discussed with reference to FIG. 4. The output of the inverse orthogonal transformer 15 is applied to the adder 20. On the other hand, the delay circuit 16 serves to delay the prediction error signal applied thereto by a time duration which the orthogonal transformer 13 requires to process the incoming prediction error signal. The subtracter 19 derives the difference between the outputs of the delay circuit 16 and the inverse orthogonal transformer 15. The output of the subtracter 19 is quantized at the quantizer 17 which applies its output to the code converter 26 and to the adder 20. The delay circuit 29 provides the prediction error signal, which is applied from the variable delay circuit 22, with a delay corresponding to the time period which the blocks 13 and 15 require to process the incoming signals and to generate the outputs, and thereafter applies its output to the adder 20.

The adder 20 is supplied with outputs from the inverse orthogonal transformer 15, the quantizer 17 and the delay circuit 29, and generates the locally decoded signal which is then fed to the frame memory 21 which stores approximately one frame data. As previously described, the variable delay circuit 22 provides the output of the frame memory 21 with a delay determined by the motion vector applied from the detector 10, and thereafter produces its output as prediction signal. In the event that the motion vector assumes zero (viz., indicating no displacement of image in a given block), the total delay at the delay circuit 16, the frame memory 21 and the variable delay circuit 22 is equal to one frame time. In this case, it is assumed that there exists no delay at each of the subtracter 12 and 19, the quantizer 17 and the adder 20.

The code converter 26 is supplied with the motion vector from the delay circuit 23 as well as the outputs of the quantizers 14 and 17, and implements code conversion. The code converter 26 produces a monitor signal which is applied to the coding controller 27. The monitor signal indicates, for example, the storage area left in a buffer memory within the code converter 26. The coding controller 27 outputs two quantization characteristics control signals which are respectively supplied to the quantizers 14 and 17 in order to control the quantization characteristics of the quantizers 14 and 17. The two quantization characteristics control signals are also fed back to the code converter 26 via the delay circuits 31 and 32, each of which provides the incoming signal with a delay which is required at the inverse orthogonal transformer 15. The detail of controlling the quantization characteristics is disclosed in U.S. Pat. No. 4,077,053 as referred to at the beginning paragraphs of this specfication.

Figure 4:
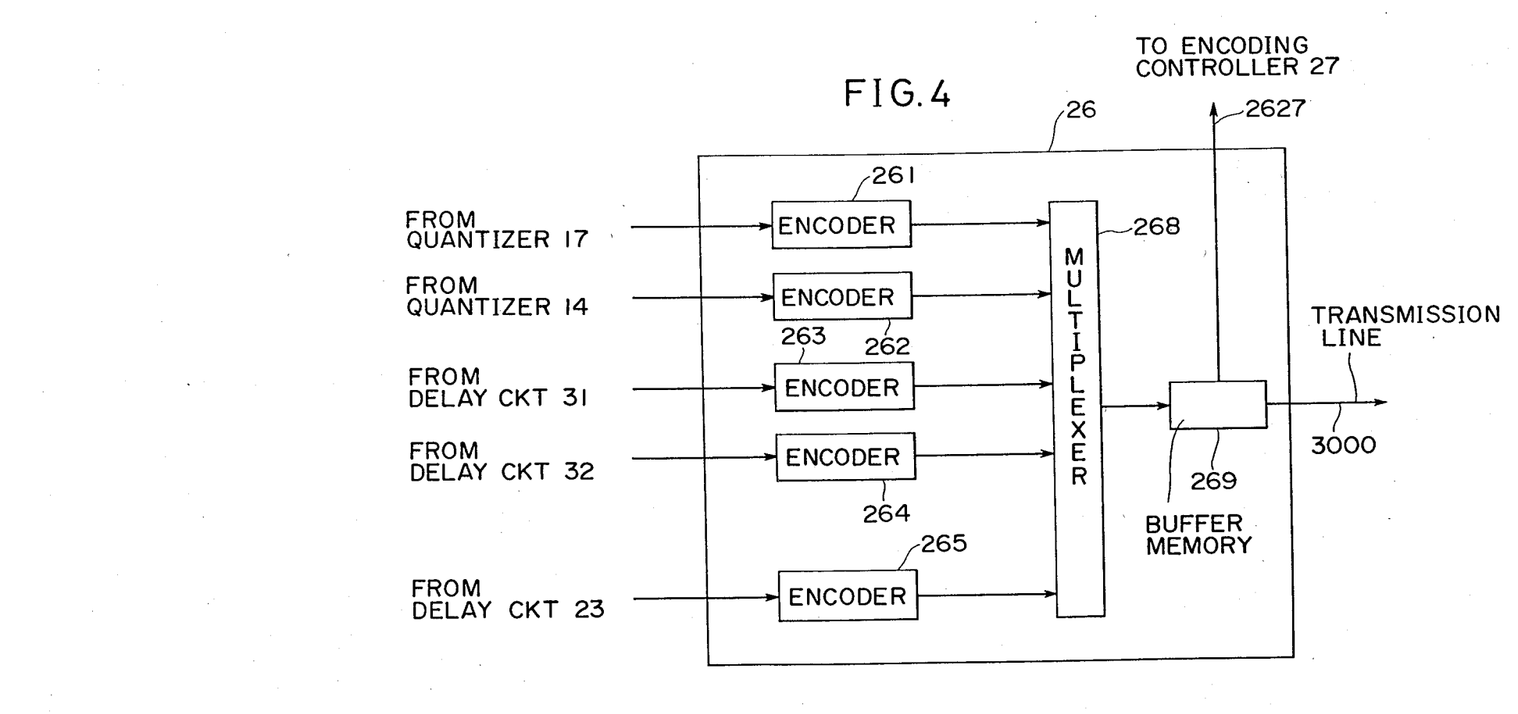
FIG. 4 is a block diagram showing in detail one block shown in FIG. 3.

The code converter 26 will be discussed in detail with reference to FIG. 4. As shown in this figure, the code converter 26 includes (a) two encoders 261 and 262 which are respectively coupled to the quantizers 17 and 14, (b) three encoders 263, 264 and 265 which are respectively coupled to the delay circuits 31, 32 and 23, (c) a multiplexer 268 having the inputs thereof respectively coupled to the aforesaid five encoders, and (d) a buffer memory 269. The buffer memory 269 has its input coupled to the output of the multiplexer 268, and is coupled to the coding controller 27 (FIG. 3) and also to a transmission line 3000.

The output of the quantizer 17 is variable-word-length encoded at the encoder 261, utilizing Huffmann codes (for example), and are converted into compressed image data, while the output of the equalizer 14 is also variable-word-length encoded at the encoder 262 utilizing Huffmann codes (for example). Similarly, the quatization characteristics control signals, applied from the delay circuits 31 and 32, are also coded at the encoders 31 and 32, respectively. On the other hand, the delayed motion vector is coded at the encoder 265. It is easy to prepare Huffmann codes which corresponds to the distribution of motion vector. The outputs of the encoders 261, 262, 263, 264 and 265 are combined at the multiplexer 268 into a predetermined order, and thereafter successively applied to the buffer memory 269. This memory 269 is provided to temporarily store the coded information applied from the multiplexer 268 and to feed same into the transmission line 300 (or a suitable storage medium) at a defined rate. The buffer memory 269 applies the coding control signal, over a line 2627, to the coding controller 27 (FIG. 3). The coding control signal indicates buffer memory occupancy (viz., 0–100%).

Figure 5:
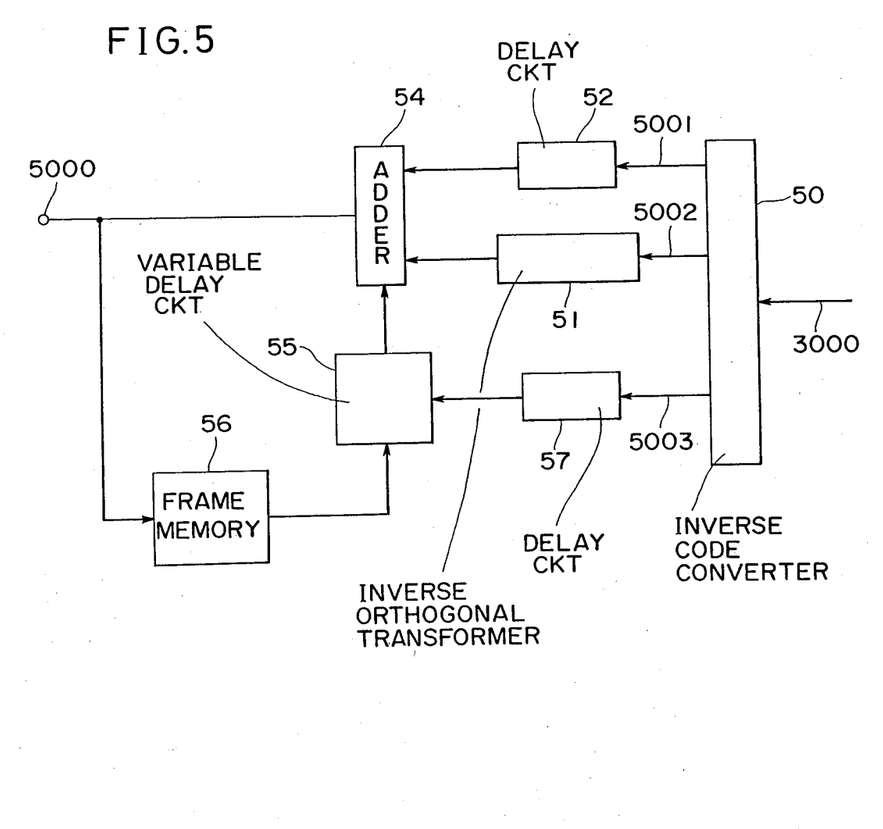
FIG. 5 shows in block diagram form a decoder according to this invention.

Referring to FIG. 5, wherein a decoder according to this invention is illustrated in block diagram form. The FIG. 5 arrangement includes an inverse code converter 50, two delay circuits 52 and 57, an inverse orthogonal transformer 51, an adder 54, a variable delay circuit 55, and a frame memory 56, all of which are coupled as shown.

Figure 6:
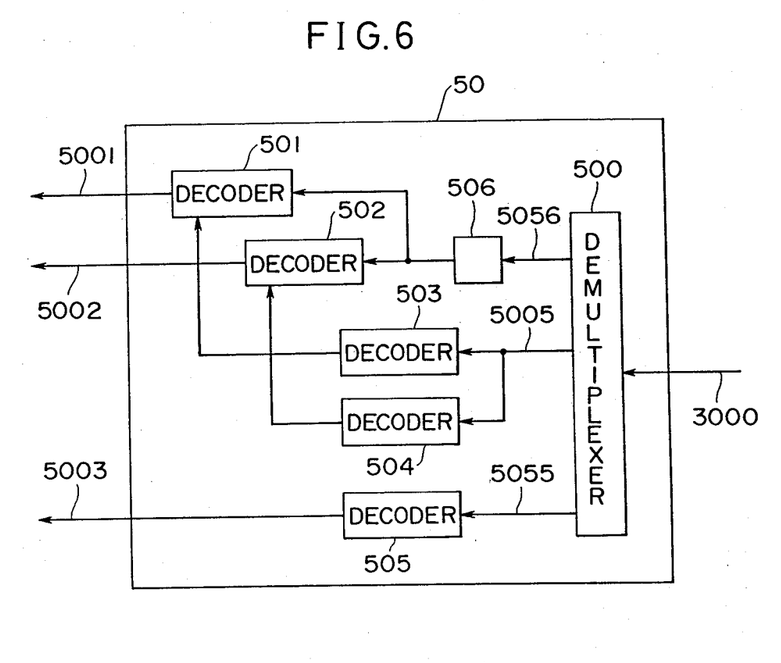
FIG. 6 is a block diagram showing in detail one of the blocks shown in FIG. 5.

Before describing the arrangement shown in FIG. 5, detail reference is made to FIG. 6 which is a block diagram showing the details of the inverse code converter 50. As shown, the converter 50 includes a demodulator 500, a delay circuit 506, and five decoders 501, 502, 503, 504 and 505. The demodulator 500 produces three kinds of outputs: (a) the results of the orthogonal transformations, and the difference between the prediction error and the result of the inverse orthogonal transformation (via a line 5056), (b) the quantization characteristics control signals (via a line 5005), and (c) the motion vector (via a line 5055). The decoder 505 corresponds to the encoder 265, and is adapted to inversely code convert the motion vector applied from the demultiplexer 500. The decoded motion vector is applied to the delay circuit 57 (FIG. 5) via a line 5003.

The quantization characteristics control signals are decoded at the decoders 503 and 504. More specifically, the decoder 503 is adapted to decode correctly the block signal wherein the prediction error signal (from the quantizer 17) is encoded, while the decoder 504 serves to decode correctly the block signal wherein the result of the orthogonal transformation (from the quantizer 14) is encoded. Otherwise, the decoders 503 and 504 do not function properly.

The outputs of the decoders 503 and 504 are fed to the decoders 501 and 502, respectively. The decoders 501 and 502 codes the output of the delay circuit 506 using the quantization characteristics signals applied from 503 and 504, respectively. It should be noted that the output of the delay circuit 506 is either the result of the orthogonal transformation or the difference between the prediction error signal and the inverse orthogonal transformation. The delay circuit 506 provides the input thereto with a delay which corresponds to the time for the decoder 503 or 504 to require for its processing.

Decodings at the decoders 501 and 502 will be decribed in detail. The decoder 501 decodes correctly an incoming block signal, if (a) the quantization characteristic signal from the decoder 503 is correctly decoded in connection with the incoming block signal and if (b) the difference between the prediction error signal and the inverse orthogonal transformation is to be decoded. On the other hand, similarly, the decoder 502 decodes correctly an incoming block signal, if (a) the quantization characteristic signal from the decoder 504 is correctly decoded in connection with the incoming block signal and if (b) the result of the orthogonal transform is to be decoded. Otherwise, the decoders 501 and 502 outputs zero. The output of the decoder 501 is fed to the delay circuit 52 via a line 5001, while the output of the decoder 502 is applied to the inverse orthogonal transformer 51 via a line 5002.

Returning to FIG. 5, the block 51 inversely orthogonally transforms the decoded signal applied over the line 5002, wherein there is no problem if a signal to be fed to the dealy cicuit 52 is present in the signal fed to the transformer 51. Similarly, if the signal applied to the delay circuit 52 over the line 5001 includes a correctly decoded signal, then proper decoding operation is ensured. The input to the delay circuit 52 is delayed by a time which the inverse orthogonal transformer 51 requires for the operation thereof. The delay circuit 57 provides the decoded motion vector with the same delay as the delay circuit 52. The variable delay ciruit 55 is supplied with the delayed motion vector and the output of the frame memory 56, and produces a prediction signal using the delay vector. The prediction signal is applied to the adder 54. The adder 54 further receives the outputs of the blocks 51 and 52d, and decodes the image signal which is applied to an outut terminal and also to the frame memory 56. The frame memory 56 is sized to store one frame signal and outputs the preceding frame signal to the variable delay circuit 55. The variable delay circuit is arranged is a similar manner as its counterpart provided in the encoder shown in FIG. 3.

The foregoing description shows only preferred embodiments of the present invention. Various modifications are apparent to those skilled in the art without departing from the scope of the present invention. For example, in the case where the motion vector is used to control the quantizers 14 and 17 with respect to the quantization characteristics thereof, the delay circuit 23 is modified to have a tap coupled to the encoding controller 27, wherein the delay at the tap is made equal to the total delay at the delay circuits 11 and 16. In this case, if the motion vector reaches around the motion compensation limit, then the quantizer 17 is controlled to output zero, while, if the motion vector is zero or close to zero, the quantizer 14 is controlled to generate a signal with zero value, by way of example. On the other hand, in the case that the motion vector is in an intermediate range, the quantizers 14 and 17 are controlled, by moderate qunatization characteristics, to realize a medium picture quality as compared to the case where the quantizers 14 and 17 is utilized independently.

What is claimed is:

1. A method of interframe prediction encoding an incoming image signal by correlating consecutive frames, comprising the steps of:

(a) producing an interframe prediction signal;
   (b) obtaining a prediction error signal by deriving a difference between said incoming image signal and said interframe prediction signal;
   (c) causing said prediction error signal to undergo orthogonal transformation on a block by block basis;
   (d) quantizing the resulting signal obtained at step (c) using a first quantizer;
   (e) causing the quantized signal obtained at step (c) to undergo inverse orthogonal transformation;
   (f) deriving a difference between said prediction error signal and the signal resulting from said inverse orthogonal transformation;
   (g) quantizing the difference obtained at step (f) using a second quantizer; and
   (h) code converting the results obtained at steps (d) and (g).

2. A method as claimed in claim 1, further comprising a step for detecting a motion vector of said incoming image signal on a block by block basis, said motion vector being utilized to produce said interframe prediction signal.

3. An arrangement for prediction encoding an incoming image signal by correlating consecutive frames, said arrangement comprising:

a first means (10) for detecting a motion vector of said incoming image signal on a block by block basis;
   a second means (22) for producing an interframe prediction signal by correlating consecutive frames via utilizing the output of said first means;
   a third means (12) which receives said incoming image signal and said prediction signal to produce a prediction error signal by deriving a difference between the signals applied thereto;
   a fourth means (13) for causing said prediction error signal to undergo orthogonal transformation on a block by block basis, said fourth means producing transformation coefficient signals;
   a fifth means (14) for quantizing said transformation coefficient signals applied thereto from said fourth means;
   a sixth means (15) for causing the quantized signal applied thereto from said fifth means to undergo inverse orthogonal transformation on a block by block basis;
   a seventh means (16) which receives said prediction error signal and the output of said sixth means and which produces a difference between the two signals applied thereto;
   an eighth means (17) for quantizing the output of said seventh means;
   a ninth means (20) for adding said interframe prediction signal and the outputs of said sixth and eighth means, said ninth means generating a locally decoded signal;
   a tenth means (21) for receiving said locally decoded signal, said tenth means providing said locally decoded signal with a delay corresponding to about one frame time; and
   an eleventh means (26) for coding at least the outputs of said fifth and eighth means.

4. An arrangement for receiving a code converted signal from an encoder to interframe prediction decode a image signal, said code converted signal including at least two kinds of prediction error signals obtained by correlating two consecutive frames, said arrangement comprising:

a first means (50) for inverse code converting said two kinds of prediction error signals;

a second means (51) for causing one of the two inverse code converted prediction error signals to undergo inverse orthogonal transform;

a third means (55) for producing an interframe prediction signal using correlation between two consecutive frames;

a fourth means (54) for producing the decoded image signal, using said interframe prediction signal, the output of said second means and the other of the two inverse code converted prediction error signals, all of which are applied to said fourth means; and a fifth means (56) for providing said decoded image signal having a delay corresponding to about one frame time, said fifth means applying the delayed signal to said third means.

* * * * *